(12) United States Patent
Hardman et al.

(10) Patent No.: US 7,111,144 B2
(45) Date of Patent: Sep. 19, 2006

(54) SYSTEMS AND METHODS FOR STORING AND RETRIEVING DATA IN A WEB SERVER ENVIRONMENT

(75) Inventors: Todd Hardman, Orem, UT (US); James Ivie, Lindon, UT (US); Michael Mansfield, Lindon, UT (US); Greg Parkinson, Orem, UT (US); Daren Thayne, Orem, UT (US); Mark Wolfgramm, Provo, UT (US); Michael Wolfgramm, Pleasant Grove, UT (US); Brandt Redd, Provo, UT (US)

(73) Assignee: MyFamily.com, Inc., Orem, UT (US)

( * ) Notice: Subject to any disclaimer, the term of this patent is extended or adjusted under 35 U.S.C. 154(b) by 8 days.

(21) Appl. No.: 10/247,787

(22) Filed: Sep. 19, 2002

(65) Prior Publication Data

US 2004/0059864 A1   Mar. 25, 2004

(51) Int. Cl.
*G06F 12/00* (2006.01)
(52) U.S. Cl. .................. 711/173; 707/10; 707/201
(58) Field of Classification Search ............ 711/165, 711/114; 707/10, 201
See application file for complete search history.

(56) References Cited

U.S. PATENT DOCUMENTS

| | | | | |
|---|---|---|---|---|
| 5,793,952 | A * | 8/1998 | Limsico ...................... | 713/202 |
| 6,282,670 | B1 * | 8/2001 | Rezaul Islam et al. ......... | 714/6 |
| 6,366,988 | B1 * | 4/2002 | Skiba et al. ................ | 711/165 |
| 6,523,036 | B1 * | 2/2003 | Hickman et al. ............. | 707/10 |
| 6,601,138 | B1 * | 7/2003 | Otterness et al. ........... | 711/114 |
| 6,671,751 | B1 * | 12/2003 | Chen et al. .................. | 710/36 |
| 6,735,671 | B1 * | 5/2004 | Kida .......................... | 711/111 |
| 6,779,095 | B1 * | 8/2004 | Selkirk et al. .............. | 711/165 |
| 2003/0046499 | A1 * | 3/2003 | Lin ............................ | 711/154 |
| 2004/0243386 | A1 * | 12/2004 | Stolowitz et al. ............. | 703/25 |

OTHER PUBLICATIONS

Architecture of a fault-tolerant RAID-5+I/O subsystem Jaffe, D.H.; System Sciences, 1993, Proceedings of the Twenty-Sixth Hawaii International Conference on , vol.: i , Jan. 5-8, 1993; pp.: 60-69 vol. 1.*
Cardellini et al., "Dynamic Load Balancing on Web-server Systems", © 1999 IEEE< p. 28-39.*
Bryhni et al., "A Comparison of Load Balancing Techniques for Scalable Web Servers", © 2000 IEEE, p. 58-64.*
Calajanni et al., "Analysis of Task Assignment Policies in Scalable Distributed Web-server Systems", © 1998 IEEE, p. 585-600.*

* cited by examiner

*Primary Examiner*—Brian R. Peugh
(74) *Attorney, Agent, or Firm*—Townsend and Townsend and Crew LLP

(57) ABSTRACT

A redundant storage system implemented in a web server environment. The system comprises a web server database accessible to multiple web servers. The web server database is comprised of at least a first and a second storage bank. The first storage bank is comprised of at least a first and a second sub-bank with at least a portion of data stored on the first sub-bank also being stored on the second sub-bank. Methods for using the storage system comprise receiving a write access addressed to the first storage bank, and storing data associated with the write access to the second storage bank when the second sub-bank is inoperable. The storage area addressed by the write access is then de-allocated.

26 Claims, 5 Drawing Sheets

SYSTEMS AND METHODS FOR STORING AND RETRIEVING DATA IN A WEB SERVER ENVIRONMENT

CROSS-REFERENCES TO RELATED APPLICATIONS

This application is being filed concurrently with related U.S. patent application Ser. No. 10/247,273, entitled "SYSTEMS AND METHODS FOR PARTITIONING DATA ON MULTIPLE SERVERS", U.S. patent application Ser. No. 10/247,806, entitled "SYSTEMS AND METHODS FOR IDENTIFYING USERS AND PROVIDING ACCESS TO INFORMATION IN A NETWORK ENVIRONMENT". Each of the aforementioned applications are incorporated herein by reference for all purposes and are filed on a date even herewith.

BACKGROUND OF THE INVENTION

This invention relates in general to systems and methods for storing information in a web server environment in a way that is scalable, reliable and continuously functional. More specifically, this invention relates to systems and methods which maintain redundant information continuously accessible during failures within a database, while minimizing transaction costs associated with reliable web server databases.

In general, economies of scale are exploited to reduce unit costs as a business grows. Thus, a larger business will generate greater profits than a smaller business providing identical services to a consumer at the same unit cost. In part, this general growth model fuels market competition and healthy economic expansion.

In contrast to the general growth model, profits generated by businesses which include a significant data storage component may actually decrease as the business grows. For example, an electronic data archival business which is profitable when processing two million transactions per day may become unprofitable when processing four million transactions per day. This is typical of a number of Internet businesses which rely on monolithic databases to support Internet transactions. This decrease in profits is integrally related to increasing transaction costs associated with conventional, monolithic databases as illustrated in FIG. 1.

Referring to FIG. 1, a two dimensional graph 100 illustrates a cost per transaction 110 verses a number of transactions 120. A line 130 connecting with a line 160 illustrates cost per transaction 110 as the number of transactions 120 varies. Initially, as line 130 indicates, cost per transaction 110 decreases as the number of transactions 120 increases. This decrease in cost occurs as economies of scale are exploited. At a point 135, cost per transaction 110 equals a revenue per transaction 180. At points above revenue per transaction 180, the business is not profitable and at points below, the business is profitable. Profits are maximized between points 140 and 150 where cost per transaction 110 is at a minimum. However, as illustrated by line 160, costs per transaction 110 increase at an accelerating rate where the number of transactions 120 exceeds that represented by point 150. Eventually, the business becomes unprofitable at a point 165 where cost per transaction 110 equals revenue per transaction 180. Thus, using this profit model, as a company becomes increasingly successful, profits will decline. This reality is counterintuitive to healthy competition. To allow for continued success and profitability, a scalable database providing a roughly equivalent cost per transaction as the number of transactions increases is desired. Such a database is represented by a line 170.

Thus, conventional technology results in accelerating cost per transaction as the number of transactions increases. This accelerating cost is inimical to healthy competition and business growth. Therefore, a need exists for advanced systems and methods for storing data reliably, efficiently and scalably.

BRIEF SUMMARY OF THE INVENTION

Embodiments of the present invention provide reliable web server databases which are continuously and fully accessible when portions of the databases are inoperable. Other embodiments of the present invention provide methods for operating the databases.

One embodiment of the present invention provides a method for redundantly storing data in a web server environment. The method comprises providing an interconnection between a database server and multiple web servers. The database server is associated with a database, which is organized into multiple storage banks. At least one of the storage banks is divided into a first and a second sub-bank. The method includes transferring data from a web server to the database server. The database server writes the data to both the first and the second sub-banks. In this way, data is redundantly stored and relatively inexpensive sub-banks may be combined to provide a database exhibiting roughly linear cost per transaction as the number of transactions increases. The database may be scaled by adding or eliminating sub-banks.

In addition, some embodiments of the present invention include preventing a write access to the first storage bank and indicating an error condition in response to an attempted write to the first storage bank when the second sub-bank is inaccessible. In some embodiments, attempts to write data to the first storage bank when the second sub-bank is inaccessible are diverted to a temporary storage. The second sub-bank is replaced and the diverted data is transferred from the temporary storage to the first and second sub-banks. Further, when replaced, the second sub-bank is populated with a copy of data from the first sub-bank. Thus, the second sub-bank contains a back-up of data on the first sub-bank.

Other embodiments include receiving a write access to a first storage bank in which one of the sub-banks is inoperable. The data associated with the write access is diverted to a second storage bank where it is stored. An out of use pointer identifying the storage area in the first storage bank to which the write access was addressed is maintained. In some embodiments, the storage area identified by the out of use pointer is de-allocated and access to the data stored during the write access is provided from the second storage bank. In this way, the sub-bank which replaces the inoperable sub-bank contains the same data stored on the other sub-bank within the first storage bank.

Another embodiment of the present invention provides a redundant storage system associated with a database server in a web server environment. The system comprises a plurality of web servers and a web server database accessible to the plurality of web servers. The web server database is comprised of at least a first and a second storage bank. The first storage bank is comprised of at least a first and a second sub-bank with at least a portion of data stored on the first sub-bank also being stored on the second sub-bank. In some embodiments, the second sub-bank is a back-up for the first sub-bank.

Yet another embodiment of the present invention provides a storage system distributed between multiple database servers in a web server environment. The system comprises a first database associated with a first database server and a second database associated with a second database server. The first database comprises a first and a second storage bank with the first storage bank comprising a first and a second sub-bank. The second database comprises a third and a fourth storage bank with the third storage bank including a third and a fourth sub-bank. At least a portion of data stored on the first sub-bank is replicated on the second sub-bank and at least a portion of data stored on the third sub-bank is replicated on the fourth sub-bank.

These and other embodiments of the present invention are described in more detail in conjunction with the text below and attached figures.

BRIEF DESCRIPTION OF THE DRAWINGS

A more complete understanding of the present invention may be derived by referring to the detailed description and claims when considered in connection the Figures, wherein like reference numbers refer to similar items throughout the Figures, and:

DETAILED DESCRIPTION OF THE INVENTION

The present invention provides reliable web server databases along with methods for operating the databases. More specifically, the present invention provides web server databases which can be scaled in size while maintaining an approximately equal cost per transaction. Thus, the present invention does not exhibit accelerating cost penalties associated with increasing the size of conventional databases. Further, web server databases according to the present invention can be distributed and associated with multiple database servers and/or unified by providing access through a single database server.

Some embodiments of the present invention comprise a Redundant Array of Inexpensive Disks (RAID) accessible to multiple web servers. The redundancy provides fault tolerance by maintaining data in multiple areas within the array. To provide redundancy, the present invention includes storage banks comprised of one or more sub-banks. The sub-banks can include data redundant on another sub-bank. In addition to the redundancy, the present invention also provides methods for replacing sub-banks in a way that web server operation proceeds without interruption and the replacement sub-bank contains an current copy of data stored on a companion bank.

Further, the invention provides for adding or removing storage banks from the database to increase or decrease storage capacity. Because each of the sub-banks costs approximately the same amount, the cost per transaction of the database remains approximately the same as the size of the databases is scaled. In addition to scalability, the cost of databases according to the present invention can be dramatically less than comparable monolithic databases. For example, one embodiment of the present invention has a unit cost of $39 per Gigabyte compared to $670 dollars per Gigabyte for a comparable monolithic database. As just one example, such a database can be comprised of 10 IDE drives arranged to provide 500 Gigabytes of storage.

The present invention thus provides a reliable, yet cost effective mass storage databases for use in a web server environment. In some embodiments of the invention, the array is comprised of Integrated Drive Electronics (IDE) mass storage devices, while in other embodiments, the array is comprised of Small Computer System Interface (SCSI) mass storage devices. In yet other embodiments, both SCSI and IDE mass storage devices are combined to form a database according to the present invention. From the following discussion, it will be evident to one skilled in the art that other types of devices also can be used to create web server databases according to the present invention.

Figure 1:
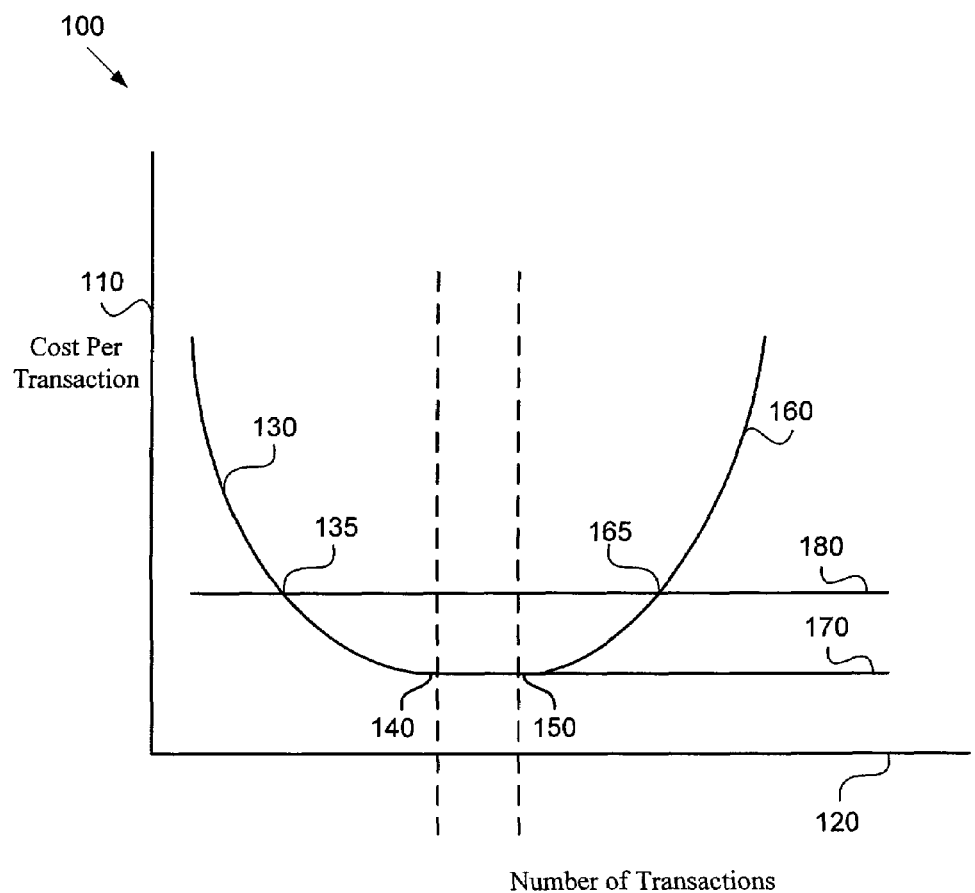
FIG. 1 illustrates a cost per transaction verses size curve of a conventional database.
Figure 2:
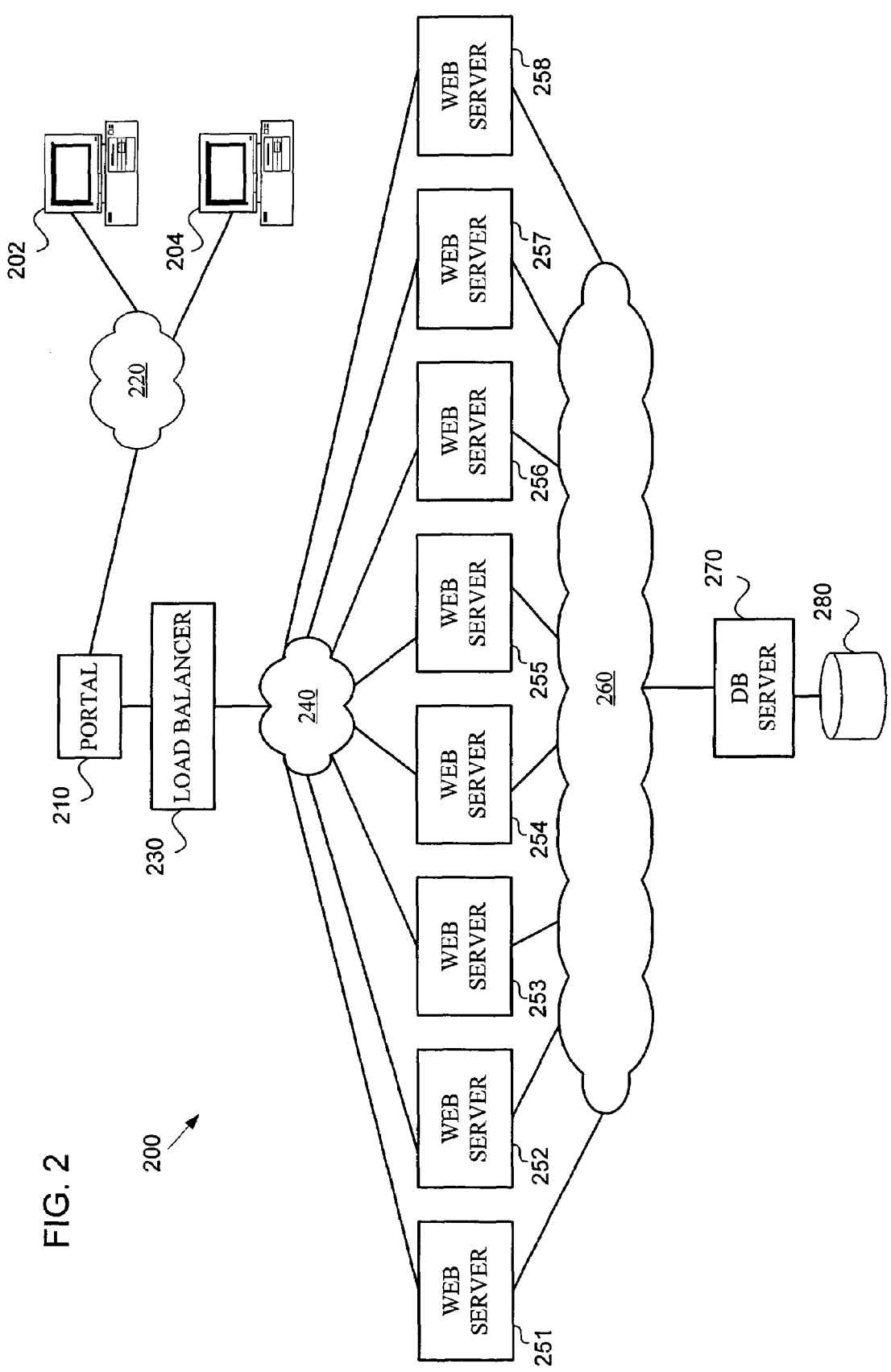
FIG. 2 illustrates a web server environment comprising a single database server and an associated database according to the present invention.

Referring to FIG. 2, an embodiment of a web server environment 200 comprising a single database server 270 and an associated database 280 according to the present invention is illustrated. Web server environment 200 comprises a portal 210 connected to the Internet 220. A number of user terminals 202, 204 are capable of connecting to portal 210 via the Internet 220. Portal 210 connects to a load balancer 230. Load balancer 230 distributes access loads across a number of web servers 251, 252, 253, 254, 255, 256, 257, 258, which are connected to load balancer 230 via a network 240 and to database server 270. A database 280 is associated with database server 270. It should be recognized by one skilled in the art that the number of web servers can be different from those illustrated in web server environment 200. For example, in one particular embodiment, web server environment 200 is comprised of sixteen web servers. In addition, one skilled in the art will recognize that additional portals 210, databases 280, and/or database servers 270 can be included in web server environment 200.

Network 240 provides a functional connection between load balancer 230 and web servers 251, 252, 253, 254, 255, 256, 257, 258. Network 240 can be any network capable of transferring data between one or more web servers 251, 252, 253, 254, 255, 256, 257, 258 and load balancer 230. In some embodiments, network 240 comprises a direct wired connection between each of the web servers and the load balancer. In other embodiments, network 240 is a Local Area Network (LAN). It should be recognized by those skilled in the art that network 240 can be a number of other network types including a Wide Area Network (WAN), an optical network, a wireless network, a crossing network, or other networks providing a functional connection between load balancer 230 and the web servers.

In one embodiment, connection between web servers 251, 252, 253, 254, 255, 256, 257, 258 and database server 270 is a direct connection between the particular web server and ports of database server 270. In other embodiments, the connection between web servers 251, 252, 253, 254, 255, 256, 257, 258 and database server 270 comprises a network connection 260. The network connection 260 can include any network allowing data transfer between a particular web server and database 270, such as, for example, a crossing network, a LAN, a WAN, a wireless network, an optical network, or other network providing functional coupling.

Portal 210 can be a microprocessor based machine capable of providing access to user terminals 202, 204 and distributing the access to one or more web servers 251, 252, 253, 254, 255, 256, 257, 258 using load balancer 230. In an embodiment, portal 210 is a web server, which provides access to a particular Internet site, such as, for example, an Internet business which archives member data and distributes the data to other members. To access the Internet site, a user provides the address, or Uniform Record Locator (URL), for portal 210 to a browser (not shown) running on user terminal 202, 204. The browser then requests access from portal 210 across the Internet 220. In response to the user's request, portal 210, using load balancer 230 selects one of the web servers 251, 252, 253, 254, 255, 256, 257, 258 to satisfy the user's request. In satisfying the request, the selected web server accesses database server 270 to retrieve and/or store information related to the user's request.

Web servers 251, 252, 253, 254, 255, 256, 257, 258 can be microprocessor based machines capable of receiving user requests, retrieving and storing data to database 270, assembling data to satisfy user requests, presenting Internet pages and any other function germane to supporting web functionality and/or an Internet site.

Database server 270 can be a microprocessor based machine providing access to database 280. Along with providing access to database 280, database server 270 can maintain tables and access information related to database 280. Possible configurations for database 280 are discussed hereafter with reference to FIGS. 4 and 5.

Figure 3:
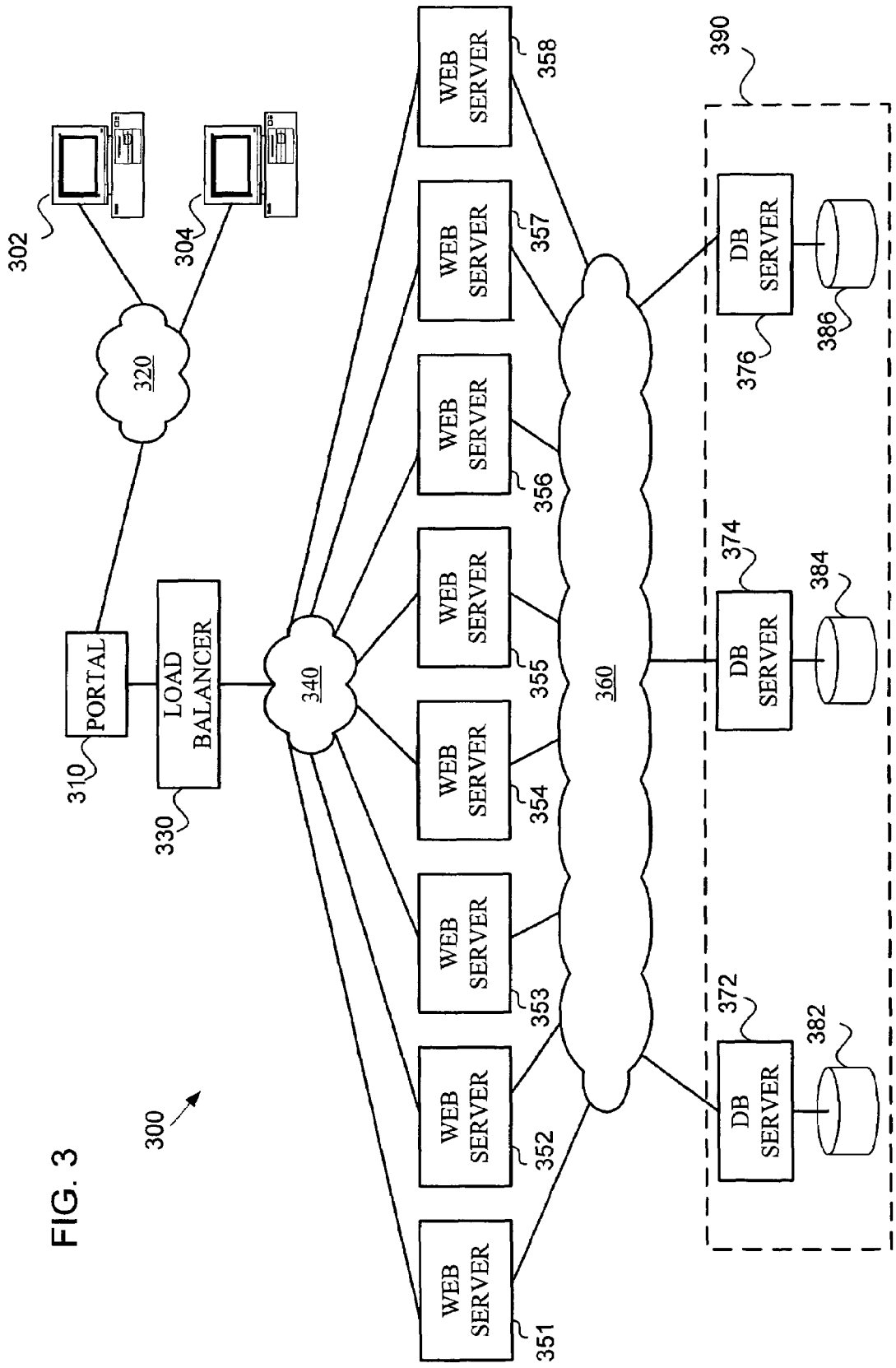
FIG. 3 illustrates a web server environment comprising a plurality of database servers and associated databases according to the present invention.

Referring to FIG. 3, an embodiment of a web server environment 300 comprising a plurality of database servers 372, 374, 376 and associated databases 382, 384, 386 according to the present invention is illustrated. A number of user terminals 302, 304 can access web server environment 300 across the Internet 320 by connecting to portal 310. Portal 310 connects to load balancer 330, which distributes loads across a number of web servers 351, 352, 353, 354, 355, 356, 357, 358. Network 340 provides a functional connection between load balancer 330 and web servers 351, 352, 353, 354, 355, 356, 357, 358. Network 340 can be any network capable of transferring data between one or more web servers 351, 352, 353, 354, 355, 356, 357, 358 and load balancer 330. In some embodiments, network 340 comprises a direct wired connection between each of the web servers and the load balancer. In other embodiments, network 340 is a Local Area Network (LAN). It should be recognized by those skilled in the art that network 340 can be a number of other network types including a Wide Area Network (WAN), an optical network, a wireless network, a crossing network, or other networks providing a functional connection between load balancer 330 and the web servers. Each of the web servers are connected to database servers 372, 374, 376 via a network 360, which can be any network capable of functionally coupling the database servers with the web servers. Database servers 372, 374, 376 are connected to databases 382, 384, 386, respectively. Database servers 372, 374, 376 can be similar to database server 270 and databases 382, 384, 386 can be similar to database 280, the details of which are described below with relation to FIGS. 4 and 5.

It should be recognized that FIGS. 2 and 3 provide exemplary embodiments of web server environments including databases according to the present invention. One skilled in the art will understand that a number of different configurations for web server environments are possible. For example, in some embodiments, each web server is directly coupled to a database and each of the databases form part of a larger distributed database.

Figure 4:
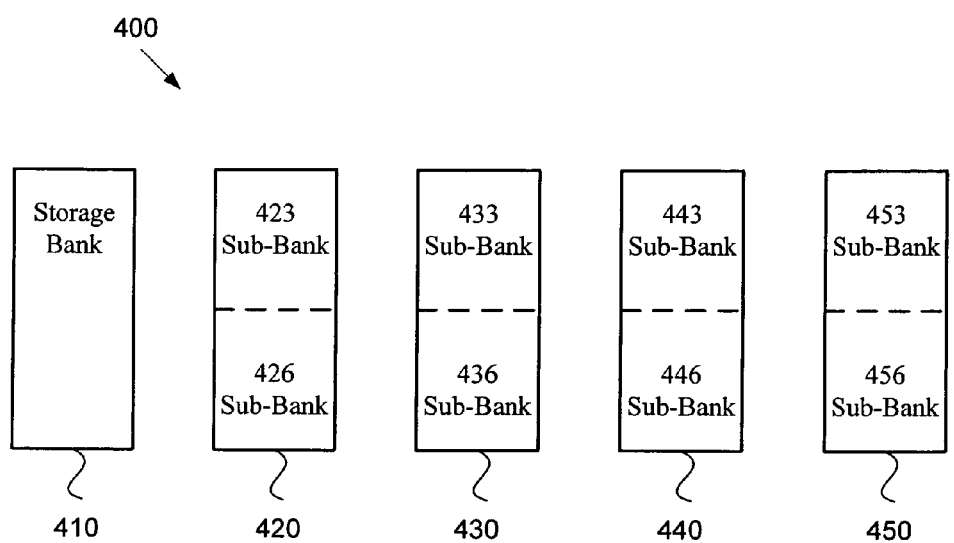
FIGS. 4 and 5 illustrate embodiments of a database according to the present invention.

Referring to FIG. 4, an embodiment 400 of database 280 associated with database server 270 is illustrated. Database 280 includes a temporary storage 410, and a number of storage banks 420, 430, 440, 450. Storage bank 420 is divided into two sub-banks 423, 426. Similarly, storage banks 430, 440 and 450 are divided into sub-banks 433 and 436, 443 and 446, and 453 and 456, respectively. Temporary storage 410, as well as each of sub-banks 423, 426, 433, 436, 443, 446, 453, 456, are connected to database server 270. The connection between database server 270 and the sub-banks provides for addressing and transfer of data to and from the sub-banks. Similar functionality is provided by the connection between temporary storage 410 and database server 270. In some embodiments, temporary storage 410 and/or the functions ascribed to temporary storage 410 are implemented using storage banks 420, 430, 440, 450. In an embodiment, temporary storage 410 is a volatile memory while in other embodiments, temporary storage 410 is non-volatile. The sub-banks 423, 426, 433, 436, 443, 446, 453, 456 may be, for example, serial accessible mass storage devices.

At this juncture, it should be noted that any number of storage banks can be used in accordance with the present invention. For example, database 280 can include only a single storage bank or as many as fifty or more storage banks. Thus, by increasing or decreasing the number of storage banks, database 280 can be scaled to provide a desired amount of storage capacity. In some embodiments, each of the storage banks provide a cost per unit of storage, and access and seek times similar to other storage banks in database 280. Accordingly, an approximately equivalent cost per transaction is exhibited as database 280 is scaled to match capacity needs.

To access data within database 280, database server 270 issues an access command, such as, for example, a read and/or write command. The access command includes a binary address identifying a particular data location within database 280. In one embodiment, the high order bits of the address identify a selected storage bank 420, 430, 440, 450 and the low order bits identify a particular location within the selected storage bank. In response to a read access from database server 270, database 280 provides data from the addressed location to database server 270. Conversely, in response to a write access from database server 270, database 280 stores data received from database server 270 to the addressed location in database 280. Of course, one skilled in the art will recognize that alternative addressing schemes can be used to uniquely identify a data location within database 280.

The relationship between sub-bank 423 and sub-bank 426 is similar to the relationship between sub-bank 433 and 436, 443 and 446 and between 453 and 456. Thus, understanding of the relationship between all of the sub-banks is provided with regard to sub-bank 423 and sub-bank 426 only.

In some embodiments, sub-bank 426 includes a replica of the data stored on sub-bank 423. Thus, when there is a failure of either sub-bank 423 or sub-bank 426, all of the data maintained in storage bank 420 remains available to database 280. In some embodiments, data from storage bank 420 is always retrieved from sub-bank 423 when sub-bank 423 is operational, and sub-bank 426 provides a back-up. But, when sub-bank 423 is inoperable, inaccessible, or otherwise fails, data from storage bank 420 is retrieved from sub-bank 426. A replacement for sub-bank 423 is provided including all data which existed on sub-bank 423 prior to the failure. In some embodiments, the replacement sub-bank is installed within database 280 and data from sub-bank 426 is copied to the replicated address space on sub-bank 423. In one embodiment, the copying process is performed while providing concurrent read access to storage bank 420 from sub-bank 426. In other embodiments, the replacement sub-bank is updated with a copy of data from sub-bank 426 before being installed within database 280.

In a particular embodiment, once the replacement for the failed sub-bank 423 is in place, read access (i.e., primary access) from storage bank 420 is resumed from sub-bank 423 and sub-bank 426 resumes its role as a backup. In another embodiment, the replacement for the failed sub-bank 423 assumes the role as a backup and read accesses to storage bank 420 are provided from sub-bank 426. This approach advantageously spreads read accesses across both sub-bank 423 and sub-bank 426.

During write accesses to storage bank 420, the write data is recorded at the same location, or address space, in both sub-bank 423 and 426. In some embodiments, if either sub-bank 423 or sub-bank 426 is not capable of storing the write data, the write access is not performed. In this way, sub-bank 426 always includes a current replica of data in sub-bank 423. As described below, the present invention provides methods to assure write data is properly stored when a failure of either sub-bank 423 or sub-bank 426 occurs. The methods involve algorithms which assure either that write data is stored, or that a user is informed of a failure to store the write data. These algorithms also assure that a replacement sub-bank includes a current replica of data maintained on a companion sub-bank.

In some embodiments, a storage bank 420, 430, 440, 450 with only a single sub-bank due to a failure of one of the companion sub-banks is marked as read-only. Marking the storage bank as read-only can be done in a number of ways. For example, in one embodiment, one or a group of read-only pointers identifying the impacted storage bank are maintained in temporary storage 410. Whenever database 280 is accessed, the read-only pointers are searched to determine if the storage area associated with the access is read-only or fully functional.

Thus, a user trying to update information maintained in a particular area within the impacted storage bank can be provided with an error message indicating the inability to update the data. The message can include a request that the user try again later to update the data. By disallowing any writes to the impacted storage bank, both sub-banks within the impacted storage bank will be identical when the failed sub-bank is ultimately replaced.

In some embodiments, requesting that the user try again later to update the data is unacceptable. This is particularly true in a web server environment where users require immediate and full access. In these embodiments, the impacted storage bank is marked as read-only, however, the write data is stored in another location within database 280. For example, in one embodiment, write data intended for the impacted storage bank is diverted and instead written to temporary storage 410 along with a current pointer indicating the intended location within the impacted storage bank. While the storage bank remains impacted, any read or write access to an area of the impacted storage bank identified by the current pointer is provided from temporary storage 410. Thus, whenever a read is performed from an impacted storage bank, temporary storage must be queried to first determine if a more current version of the data exists in temporary storage 410. If a more current version exists, it is provided from temporary storage 410 rather than the impacted storage bank. Alternatively, where a more current version does not exist, the read access is provided from the impacted storage bank.

Once the failed sub-bank within the impacted storage bank is replaced, any more current data maintained in temporary storage 410 and associated with the repaired storage bank is written to both sub-banks within the storage bank. In this way, data may be written to storage areas within an impacted storage bank, yet the replaced sub-bank will still contain a current replica of all information on the companion sub-bank.

In yet other embodiments, the remaining sub-bank is not maintained as read-only, but rather, a user is allowed to write to the sub-bank during periods when the companion sub-bank is inoperable. However, any data written to the sub-bank is appended with an indication that it has been written since the companion sub-bank became inoperable. Thus, once the companion sub-bank is replaced, any newer versions of data on the operational sub-bank are replicated on the previously failed sub-bank.

In yet other embodiments, a storage bank including a failed sub-bank is marked read-only and any write access to storage areas within the impacted storage bank are diverted to another storage bank within database 280 which is fully functional. The write data is stored to the fully functional storage bank and associated with a pointer providing the address of the new location within database 280. An out of use pointer identifying the area within the impacted storage bank where the write data was intended to be stored is maintained in temporary storage 410. Upon replacement of the failed sub-bank within the impacted storage bank, areas within the impacted storage bank associated with the out of use pointer are de-allocated and may then be used to store other data. Thus, de-allocation includes any process which releases and/or prepares a data storage area to be used for storing other data.

This process of de-allocating superceded storage areas can be referred to as garbage collection. Garbage collection makes previously unusable storage areas available for future allocation. In some embodiments, garbage collection further includes de-fragmentation of database 280. Garbage collection can be performed immediately after a failed sub-bank is replaced, or at any other time. For example, in some embodiments, garbage collection is performed once a week.

Preferably, sub-bank 423 and 426 are identical. As sub-bank 426 provides a back-up for sub-bank 423, having one sub-bank larger than the other can be wasteful, unless a purpose for the disparate storage capacity exists. Further, fewer spare sub-banks must be maintained where sub-bank 426 and sub-bank 423 are identical. However, in some embodiments, sub-banks 423 and 426 include the same capacity, but exhibit different mechanical and/or electrical specifications. For example, sub-bank 423 may provide a higher Mean Time Between Failure (MTBF) under constant read conditions than sub-bank 426. Conversely, sub-bank 426 may provide a higher MTBF than sub-bank 423 for uses involving considerable idle periods. Thus, sub-bank 423 is better suited to provide primary data access to database server 270 and sub-bank 426 is better suited for back-up purposes. Additionally, sub-bank 423 may provide faster read access, yet cost more than sub-bank 426. Thus, using different sub-banks can allow for a less expensive database 280, which minimizes read access times.

In other embodiments, sub-bank 423 and sub-bank 426 each provide a component of backup capability and a component of read access capability. For example, sub-banks 423 and 426 can each contain a data set one in a first address space and a data set two in a second address space. When both sub-bank 423 and sub-bank 426 are operational, read access to data set one is provided from sub-bank 423 and read access to data set two is provided from sub-bank 426. In this way, read accesses are distributed across both sub-bank 423 and sub-bank 426. This distributes wear across both sub-banks 423 and 426 and can be used to increase performance of database 280, where read accesses to sub-banks 423 and 426 are interleaved.

In one particular embodiment of the present invention, database 280 is 500 Gigabytes. Database 280 comprises five storage banks each divided into two sub-banks. Each of the sub-banks comprise an IDE drive.

Figure 5:
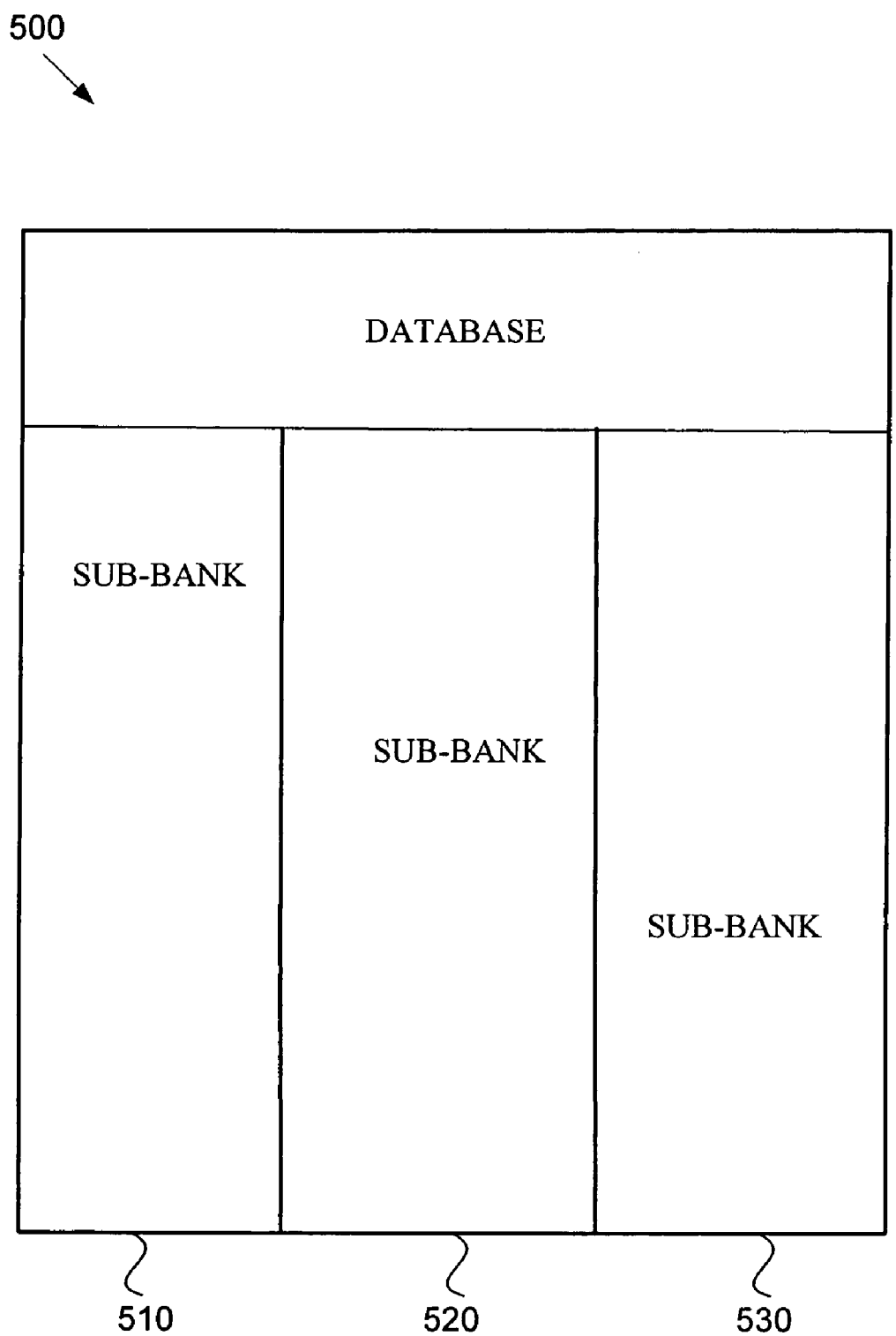

It should be recognized that storage banks 420, 430, 440, 450 can include more than two sub-banks. For example, FIG. 5 illustrates an embodiment of database 280 comprising a storage bank 500 which includes three sub-banks 510, 520, 530. It should be recognized that while only one storage bank 500 is illustrated, additional storage banks can be included within the embodiment of database 280.

Various storage algorithms can be implemented across sub-banks 510, 520, 530. In some embodiments, all data within storage bank 500 is replicated across all sub-banks 510, 520, 530. This provides a dual redundant database 280 which is highly resistant to data loss in the event of a failure. Further, data may be interleaved across sub-banks 510, 520, 530 which can increase read access performance of database 280. It should be noted that discussion of replacement methods, garbage collection, and copying data to replacement sub-banks provided in relation to two sub-bank databases is applicable to databases comprised of three or more sub-banks.

In one particularly useful embodiment, sub-banks 510, 520, 530 each include a replica of data maintained on one of the other sub-banks, but not a replica of all data maintained on storage bank 500. For example, sub-bank 510 can include a data set one and a data set two, sub-bank 520 can include the data set two and a data set three, and sub-bank 530 can include the data set three and the data set one. In this way, a redundant copy of all data within storage bank 500 exists and the failure of any single sub-bank will not jeopardize any data. By replicating data on only two sub-banks rather than all three, storage capacity is more efficiently utilized. Further, read data accesses may be interleaved across all sub-banks 510, 520, 530 to increase performance of database 280.

In light of the preceding discussion several advantages of the present invention are evident. For example, the present invention provides a scalable database where the cost per transaction for a small database is approximately the same as the cost per transaction for a large database. This scalability allows a company which is reliant on database systems to exploit economies of scale as the company grows. In addition, the present invention provides systems and methods for assuring reliable service, both in terms of access and data security, which is desirable in a web server environment.

Although the invention is described with reference to specific embodiments and figures thereof, the embodiments and figures are merely illustrative, and not limiting of the invention. Rather, the scope of the invention is to be determined solely by the appended claims.

What is claimed is:

1. A redundant data storage system associated with a database server in a web server environment, the system comprising:
   a plurality of web servers;
   a load balancer for distributing access requests to the plurality of web servers;
   a web server database accessible to the plurality of web servers, wherein the web server database is comprised of at least a first and a second storage bank;
   wherein the first storage bank is comprised of at least a first and a second sub-bank; and
   wherein at least a substantial portion of data stored on the first sub-bank is also stored on the second sub-bank.

2. The system of claim 1, wherein all data stored on the first sub-bank is also stored on the second sub-bank, and wherein the second sub-bank is a back-up for the first sub-bank.

3. The system of claim 1, wherein the first sub-bank and the second sub-bank each comprise a first address space and a second address space, and wherein primary access to the first address space is from the first sub-bank and primary access to the second address space is from the second sub-bank.

4. The system of claim 1, wherein the first storage bank further comprises a third sub-bank, and wherein at least a portion of data maintained on the second sub-bank is also maintained on the third sub-bank.

5. The system of claim 4, wherein the first sub-bank comprises a first address space and a second address space, the second sub-bank comprises the second address space and a third address space, the third sub-bank comprises the third address space and the first address space.

6. The system of claim 5, wherein the second sub-bank provides a primary access to the second address space and the third sub-bank provides a back-up of the second address space.

7. The system of claim 1, wherein the first sub-bank is a serial accessible mass storage device.

8. The system of claim 1, wherein the first sub-bank is an IDE mass storage device.

9. The system of claim 1, wherein the first sub-bank is an SCSI mass storage device.

10. The system of claim 1, further comprising a temporary storage area associated with the database server.

11. The system of claim 1, wherein the plurality of web servers comprises a first and a second web server, and wherein the web server database is a first web server database associated with the first web server, the system further comprising:
    a second web server database associated with the second web server, wherein data from the second web server database is accessible to the first web server.

12. A method for redundantly storing data in a web server environment comprising multiple web servers, the method comprising:
    providing an interconnect between a first web server and a database server and a second web server and the database server;
    providing a load balancer, wherein the load balancer distributes access requests to the web servers;
    providing a database associated with the database server, wherein the database comprises a first and a second storage bank, and wherein the first storage bank is comprised of at least a first and a second sub-bank, and wherein the first and the second sub-banks each comprise an address space; and
    transferring data from the first web server to the database server, wherein the database server writes the data to the address space of the first and the second sub-banks.

13. The method of claim 12, wherein the database server writes the data to the address space of the first and the second sub-banks concurrently.

14. The method of claim 12, wherein the address space is a first address space, and wherein the first and the second sub-banks each comprise a second address space, the method further comprising:
    transferring data to the second address space of the first and the second sub-banks, wherein, in the absence of a failure of either the first sub-bank or the second sub-bank, data in the first address space is read from the first sub-bank and data in the second address space is read from the second sub-bank.

15. The method of claim 12, further comprising:
preventing a write access to the first storage bank when the second sub-bank is inaccessible.

16. The method of claim 15, further comprising:
indicating an error condition when the second sub-bank is inaccessible and a write access is attempted to the first storage bank.

17. The method of claim 15, further comprising:
diverting data addressed to the first storage bank to a temporary storage when the second sub-bank is inaccessible; and
replacing the inaccessible second sub-bank; and
transferring the diverted data to the first storage bank, wherein the first storage bank comprises the replaced second sub-bank.

18. The method of claim 17, further comprising: copying data from the first sub-bank to the replaced second sub-bank.

19. The method of claim 12, further comprising:
receiving a write access to the first storage bank when the second sub-bank is inoperable;
storing data associated with the write access to the second storage bank; and
maintaining an out of use pointer to the storage area of the first storage bank to which the write access was addressed.

20. The method of claim 19, further comprising:
providing access to the data at the second storage bank; and
de-allocating a storage area in the first storage bank associated with the out of use pointer, wherein a sub-bank replacing the inoperable second sub-bank contains the same data stored on the first sub-bank.

21. The method of claim 20, wherein the de-allocating the storage area comprises deleting data maintained in the storage area.

22. The method of claim 12, wherein the database comprises a third sub-bank, and wherein the address space is a first address space, the method further comprising:
writing data to a second address space in the second sub-bank and in the third sub-bank;
writing data to a third address space in the first sub-bank and the third sub-bank; and
wherein, in the absence of a failure of the third sub-bank, the data in the third address space is read from the third sub-bank.

23. A storage system distributed between multiple database servers in a web server environment, the system comprising:
a plurality of web servers;
a load balancer for distributing access requests to the plurality of web servers;
a first database associated with a first database server and a second database associated with a second database server;
the first database comprising a first and a second storage bank, at least the first storage bank comprising a first and a second sub-bank;
the second database comprising a third and a fourth storage bank, at least the third storage bank including a third and a fourth sub-bank;
wherein at least a portion of data stored on the first sub-bank is replicated on the second sub-bank; and
wherein at least a portion of data stored on the third sub-bank is replicated on the fourth sub-bank.

24. The storage system of claim 23, wherein the first, second, third and fourth storage banks comprise IDE mass storage devices.

25. The storage system of claim 23, wherein the first and second sub-banks are concurrently written.

26. The storage system of claim 23, wherein the first and second database servers are accessible to the plurality of web servers.

* * * * *

UNITED STATES PATENT AND TRADEMARK OFFICE
CERTIFICATE OF CORRECTION

PATENT NO. : 7,111,144 B2 Page 1 of 1
APPLICATION NO. : 10/247787
DATED : September 19, 2006
INVENTOR(S) : Hardman et al.

It is certified that error appears in the above-identified patent and that said Letters Patent is hereby corrected as shown below:

On the Title page,

[*] Notice: Subject to any disclaimer, the term of this patent is extended or adjusted under 35 USC 154(b) by (8) days Delete the phrase "by 8 days" and insert -- by 281 days--

Signed and Sealed this

Twentieth Day of March, 2007

JON W. DUDAS
*Director of the United States Patent and Trademark Office*